(12) United States Patent
Perera Mercado et al.

(10) Patent No.: US 8,273,173 B2
(45) Date of Patent: Sep. 25, 2012

(54) NANO-ADDITIVE FOR HYDROCARBON WELL CEMENTING OPERATIONS

(75) Inventors: Yibran Argenis Perera Mercado, Edo. Miranda (VE); Johanna Carolina Cano Ramirez, Edo. Miranda (VE); Adriana Carolina Hurtado Acevedo, Caracas (VE); Susana Isabel Martinez Méndez, Edo. Miranda (VE)

(73) Assignee: Intevep, S.A., Caracas (VE)

( * ) Notice: Subject to any disclaimer, the term of this patent is extended or adjusted under 35 U.S.C. 154(b) by 987 days.

(21) Appl. No.: 12/234,920

(22) Filed: Sep. 22, 2008

(65) Prior Publication Data

US 2010/0075874 A1    Mar. 25, 2010

(51) Int. Cl.
    *C04B 14/04* (2006.01)
(52) U.S. Cl. ............... 106/737; 501/12; 423/338
(58) Field of Classification Search ........ 106/737; 501/12; 423/338
    See application file for complete search history.

(56) References Cited

U.S. PATENT DOCUMENTS

| | | | | |
|---|---|---|---|---|
| 4,900,359 | A * | 2/1990 | Gelbman | 106/681 |
| 5,183,505 | A * | 2/1993 | Spinney | 106/672 |
| 5,221,497 | A * | 6/1993 | Watanabe et al. | 516/83 |
| 5,932,000 | A * | 8/1999 | Bergqvist et al. | 106/737 |
| 6,513,592 | B2 | 2/2003 | Espin et al. | |
| 6,554,070 | B2 | 4/2003 | Genolet et al. | |
| 6,765,153 | B2 | 7/2004 | Goodson | |
| 7,559,369 | B2 * | 7/2009 | Roddy et al. | 166/280.2 |
| 7,674,331 | B2 * | 3/2010 | Drochon et al. | 106/600 |
| 7,784,542 | B2 * | 8/2010 | Roddy et al. | 166/293 |
| 7,806,183 | B2 * | 10/2010 | Roddy et al. | 166/293 |
| 7,892,352 | B2 * | 2/2011 | Roddy et al. | 106/737 |
| 8,002,889 | B2 * | 8/2011 | Drochon et al. | 106/600 |
| 2006/0078682 | A1 | 4/2006 | McDaniel et al. | |
| 2006/0213395 | A1 | 9/2006 | Lu et al. | |
| 2006/0254466 | A1 | 11/2006 | Drochon et al. | |
| 2006/0258546 | A1 | 11/2006 | Brannon et al. | |
| 2007/0056732 | A1 | 3/2007 | Roddy et al. | |
| 2008/0032053 | A1 * | 2/2008 | Kourtakis et al. | 427/387 |
| 2010/0016183 | A1 * | 1/2010 | Roddy et al. | 507/225 |
| 2010/0243236 | A1 * | 9/2010 | Koons | 166/177.4 |
| 2011/0056411 | A1 * | 3/2011 | Schmidt et al. | 106/806 |
| 2011/0162845 | A1 * | 7/2011 | Ravi et al. | 166/293 |

FOREIGN PATENT DOCUMENTS

WO    97/49644 A1    12/1997
WO    0232827    4/2002

OTHER PUBLICATIONS

European Search Report for EP 08019223.0, dated Apr. 20, 2009.
Wen-Ten Kuo et al., "Effects of Nano-Materials on Properties of Waterworks Sludge Ash Cement Paste", J.Ind.Eng. Chem., 2006, pp. 702-709, vol. 12, No. 5.

(Continued)

*Primary Examiner* — Paul Marcantoni
(74) *Attorney, Agent, or Firm* — Bachman & LaPointe, P.C.

(57) ABSTRACT

A cement additive, comprising nanostructured or not particles of $SiO_2$—$CaO$—$Al_2O_3$ and at least one additive selected from the group consisting of nano-sized particles of $SiO_2$, $2CaO.SiO_2$, $3CaO.SiO_2$, $Al_2O_3$, P—Ca and/or combinations thereof.

9 Claims, 6 Drawing Sheets

$C_2S$ - nano dicalcium silicate $C_3S$ - nano tricalcium silicate $SiO_2$ - nano silica (silicon dioxide)

$Al_2O_3$ - nano alumina (aluminium oxide)

P-Ca - nano phosphorous/calcium

S-C-A - nanostructured material (Silicium-Calcium-Aluminium)

OTHER PUBLICATIONS

F. Pancrazi et al., "Gels in the System CaO-Al2O3-SiO2 Preparation and Structural Evolution", Journal De Physique, Dec. 1982, pp. C9-279-C9-283, vol. 43, No. 12, published online by EDP Sciences.

Dr. Dietmar Stephan et al., "Synthesis of Pure Cementitious Phase by Sol-Gel Process as Precursor", Z. Anorg. Allg. Chem., 2004, pp. 1477-1483, vol. 630, WILEY-VCH Verlag GmbH & Co. KGaA, 69451 Weinheim, Germany.

Perera et al., Characterization of nano-cement phases by field emission scanning electron microscopy (FESEM), Acta Microscopica vol. 16, No. 1-2, (Supp. 2) 2007.

European Office action for Application No. 08 019 223.0-2111 dated Feb. 19, 2012.

Chilean Search Report for Application No. 2008-3263 dated Jan. 11, 2012.

* cited by examiner

NANO-ADDITIVE FOR HYDROCARBON WELL CEMENTING OPERATIONS

BACKGROUND OF THE INVENTION

The invention relates to hydrocarbon well cementing operations and, more specifically, to an additive for improving characteristics of the resulting cement structure.

Existing cement systems for hydrocarbon wells are used to complete the well and stabilize communication between the surface and a particularly desirable zone of the well. Problems exist with such cement systems, for example, when the cement systems have low mechanical properties, when the surrounding formations have low mechanical properties, when problems with migration of gas and fluids exist, and when the system will be subject to attack by sour gas. The need exists for improved cement systems to address these various types of conditions.

SUMMARY OF THE INVENTION

In accordance with the present invention, the forgoing need has been met.

According to the invention, a cement additive is provided which comprises particles of $SiO_2$—$CaO$—$Al_2O_3$ and at least one additive selected from the group consisting of nano-sized particles of $SiO_2$, $2CaO.SiO_2$, $3CaO.SiO_2$, $Al_2O_3$, P—Ca and combinations thereof.

In further accordance with the invention, a cement product is provided which comprises cement particles and particles of $SiO_2$—$CaO$—$Al_2O_3$ and at least one additive selected from the group consisting of nano-sized particles of $SiO_2$, $2CaO.SiO_2$, $3CaO.SiO_2$, $Al_2O_3$, P—Ca and combinations thereof.

A method for making the cement additive is also provided, which method comprises the steps of: separately synthesizing each of the particles of $SiO_2$—$CaO$—$Al_2O_3$ and the nano-sized particles or precursors to the particles of $SiO_2$—$CaO$—$Al_2O_3$ and nano-sized particles; thermally treating the precursors to obtain the particles of $SiO_2$—$CaO$—$Al_2O_3$ and nano-sized particles; mixing the particles of $SiO_2$—$CaO$—$Al_2O_3$ and nano-sized particles under controlled temperature and pH to form a continued surfactant system containing the particles of $SiO_2$—$CaO$—$Al_2O_3$ and nano-sized particles; and combining the particles of $SiO_2$—$CaO$—$Al_2O_3$ and nano-sized particles in a common solvent to provide a substantially homogeneous mixture of the particles of $SiO_2$—$CaO$—$Al_2O_3$ and the nano-sized particles.

BRIEF DESCRIPTION OF THE DRAWINGS

A detailed description of preferred embodiments of the drawings follows, with reference to the attached drawings, wherein.

DETAILED DESCRIPTION

The invention relates to a nano-additive which is particularly useful in cement mixtures, especially cement mixtures which are to be used for completion or other operations of hydrocarbon wells.

The additive can be useful in any type of cement, and serves to fill interstitial areas and other areas of high structural porosity in the cement, thereby reducing permeability of the cement and enhancing strengths and other desirable properties of the cement when cementing is completed. In the final cement structure, the nano particles of the additive are distributed through the nanostructured particles of $SiO_2$—$CaO$—$Al_2O_3$ to help produce the desired characteristics in the cement structure.

The additive of the present invention comprises particles of a ternary system of $SiO_2$—$CaO$—$Al_2O_3$. Of these materials, $SiO_2$ will frequently be abbreviated to S as used herein, the CaO will frequently be abbreviated to C as used herein and the $Al_2O_3$ will frequently be abbreviated to A as used herein. Thus, $C_2S$ refers to dicalcium silicate, or $2CaO.SiO_2$, and $C_3S$ similarly refers to tricalcium silicate or $3CaO.SiO_2$. Mixed with this ternary system are nano-sized particles selected from the group consisting of nano-$SiO_2$, nano-$C_2S$, nano-$C_3S$, nano-$Al_2O_3$ and nano-phosphorous/calcium. Ideally, the additive of the present invention includes each of these components mixed with the ternary system. Further, the particles of the ternary system themselves can also preferably be nano-sized particles and can be nanostructured or not nano structured.

As used herein, a nano-sized particle is considered to be any particle 999 nm in size or smaller. Further, specific preferred sizes of these particles are as follows. The particle size of the additive, that is, particles of $SiO_2$, $2CaO.SiO_2$, $3CaO.SiO_2$, $Al_2O_3$, and P—Ca, is preferably smaller than 100 nm. The particles of the ternary system of $SiO_2$—$CaO$—$Al_2O_3$ are preferably smaller than 900 nm. Preferably, the additive particle size is smaller than the ternary system particle size.

Figure 1:
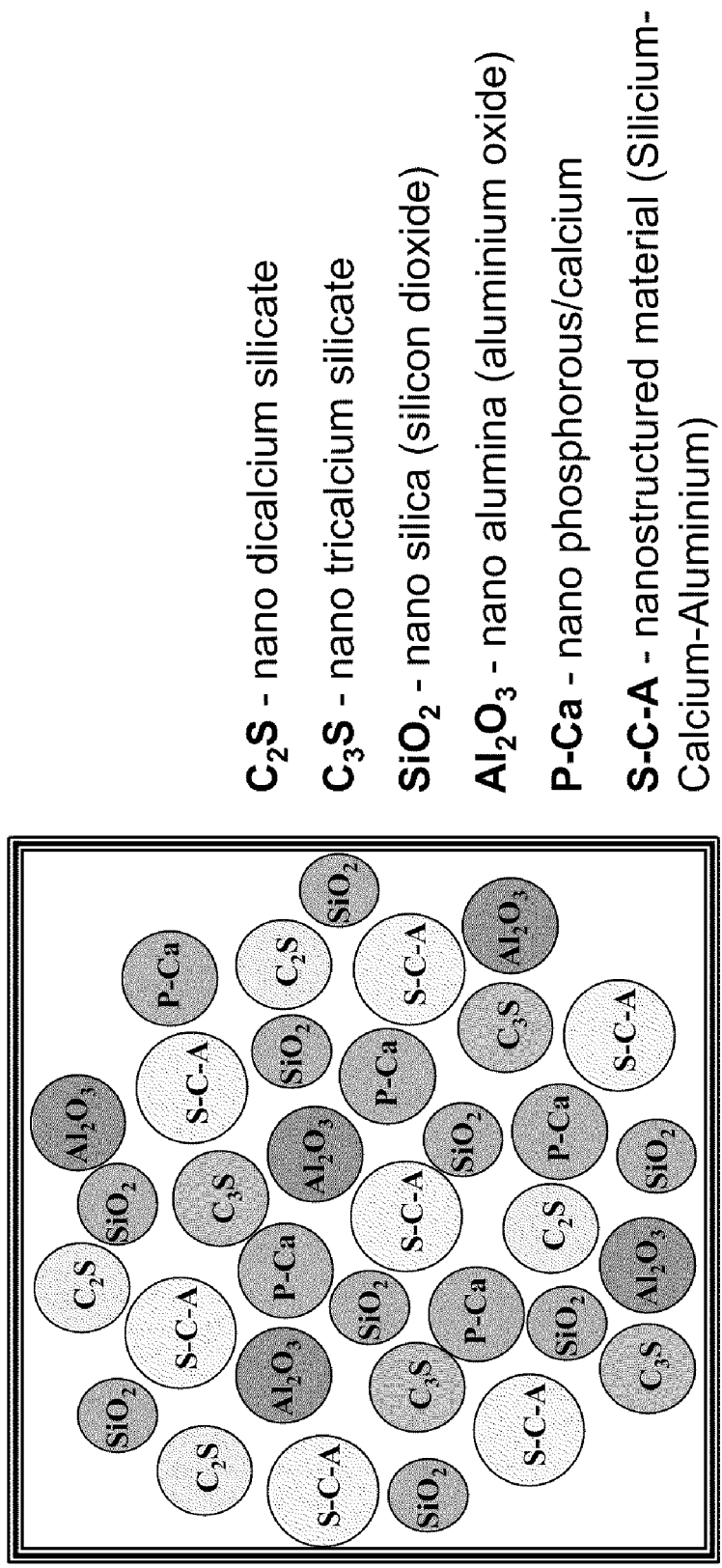
FIG. 1 illustrates a nano-additive system according to the invention.

FIG. 1 shows an additive system in accordance with the present invention, with particles of the ternary system, shown in FIG. 1 as S—C-A, and nano-sized particles of nano-$SiO_2$, nano-$C_2S$, nano-$C_3S$, nano-$Al_2O_3$ and nano-phosphorous/calcium. An additive such as illustrated in FIG. 1 exhibits excellent superficial energy and thus grows conglomerates which contain the nano-particles as nuclei. This type of conglomeration helps the additive to provide beneficial characteristics in the resulting cementing matrix. Further, during cementing operations, the additive helps the cement develop a desirable gel C—S—H condition during hydration. Hydration of the nano-sized S—C-A material produces the gel C—S—H as well as a certain amount of calcium hydroxide, $Ca(OH)_2$, that will act directly with the nano-$SiO_2$ to produce additional C—S—H gel. Hydration of the nano-$C_2S$ and nano-$C_3S$ produces additional C—S—H gel. The nano-$Al_2O_3$ can react also with the calcium hydroxide, $Ca(OH)_2$, to produce C-A-H gel and also C-A-S—H gel when the reaction is together with nano-$SiO_2$ particles. Additionally, the nano-phosphorous/calcium and its chemical reactions will provide high chemical resistance within the matrix cementing system. The simultaneous chemistry interaction between all the nano-components produce a direct increase in the mechanical, thermal and chemical properties of the final solid body.

As set forth above, this increase in mechanical, thermal and chemical properties is particularly useful in solving problems with oil and gas well cement systems with low mechanical properties, systems with gas and fluid migration problems, systems that are subject to sour gas attack, and the like.

When used to form a cement system, the cement additive is mixed with the cement, and the following chemical reactions occur.

Cementitious Nanomaterial Reactions:

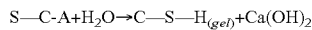

$$S-C-A+H_2O \rightarrow C-S-H_{(gel)}+Ca(OH)_2$$

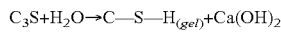

$$C_3S+H_2O \rightarrow C-S-H_{(gel)}+Ca(OH)_2$$

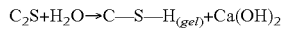

$$C_2S+H_2O \rightarrow C-S-H_{(gel)}+Ca(OH)_2$$

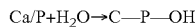

$$Ca/P+H_2O \rightarrow C-P-OH$$

Pozzolanic Nanomaterial Reactions:

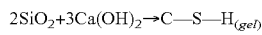

$$2SiO_2+3Ca(OH)_2 \rightarrow C-S-H_{(gel)}$$

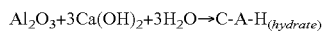

$$Al_2O_3+3Ca(OH)_2+3H_2O \rightarrow C-A-H_{(hydrate)}$$

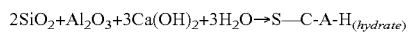

$$2SiO_2+Al_2O_3+3Ca(OH)_2+3H_2O \rightarrow S-C-A-H_{(hydrate)}$$

In addition to the above, possible chemical reactions can also occur between the nano-phosphorous/calcium and the nano-$SiO_2$, nano-$Al_2O_3$ and/or $Ca(OH)_2$, and this can increase also the mechanical and chemical properties of the resulting structure. Thus, the nano-additive of the present invention produces controlled simultaneous reaction kinetics, interfacial reactions, in-situ phase transformations and microstructure development which are key in accomplishing the objectives of the present invention.

The nano-particles of the additive can have a spherical, ellipsoid, or plate shape, or can be irregular in shape, and can also include ceramic nano-particles disbursed therein. As set forth above, these nano-particles preferably have a particle size of between about 1 and 100 nm.

According to the invention, the nano-additive can be prepared using a sol-gel procedure. This can be used to generate the different desired nano-particles, preferably separately. The preparation method can begin by controlled mixing of precursors, for example, $Ca(NO_3)_2.4H_2O$ and Tetraethylorthosilicate (TEOS). This mixing is conducted under controlled parameters such as temperature and pH. Preferably, the temperature and pH are limited to a temperature of 80° C. and a pH of 1-7. The ratio of the different components can be selected so as to produce desired components, for example, $C_2S$, $C_3S$ and the like.

The nano-particles are obtained using a defined nano-confinement surfactant system that is obtain when the systems reach their critical micelle concentration (CMC) for each specific surfactant, and the system is then thermally treated at a desired temperature to produce the desired crystalline phases. The crystalline phases can then be intimately mixed with any desirable cement, and will provide the above-mentioned benefits during hydration and ultimate curing of the cementitious structure. Specifically, the nano-particles will fill interstitial spaces and other areas of high porosity in the cement, and produce a far less permeable structure.

As mentioned above, it is preferred that each component of the nano-additive be synthesized separately. After each component is synthesized, they can be coupled into a common solvent, for examples, an aqueous systems, which preferably will be compatible with the cementitious system. The stoichiometric relation between each component of the nano-additive can advantageously be calculated based upon the needs of the final system. Following this process, the components of the additive can be produced separately, combined into a common solvent, and mixed with cement of the final cementations system, as desired. Following this addition, any other components of the cement system can also be added.

The amount of nano-additive to be used depends upon the conditions of curing (temperature, pressure, etc.) and the interaction with other components in the cementitious system which may be present for other conditions to be controlled. For example, if the cementing system is more than 50% cement, it may be desirable to utilize the nano-additive according to the present invention in an amount between about 0.1 and about 5% weight of the cement. On the other hand, if the final cement system is to be a cement system similar to a concrete formulation, the amount of nano-additive to use can preferably be between about 1 and about 20% weight of the cement system.

The following examples demonstrate synthesis of the various components of the additive of the present invention.

Example 1

Preparation of Highly Reactive Nano-$C_3S$ and Nano-$C_2S$ Phases

Samples were prepared using a sol-gel procedure modified by surfactant. Following this procedure, a sufficient and controlled mixing of pure precursors was conducted. These precursors were, in this example, $Ca(NO_3)_2.4H_2O$, and Tetraethylorthosilicate (TEOS). These components were mixed under controlled room temperature and pH between 3-6. The $CaO:SiO_2$ molar ratio in the starting mixture was set at 2:1 for one sample and 3:1 for another sample in order to obtain $C_2S$ and $C_3S$ respectively. Nano-particles were obtained using a combined surfactant system, and the nano-$C_3S$ and nano-$C_2S$ final crystalline phases were obtained following a thermal treatment at 900° C. and 1400° C. respectively.

Figure 2A:
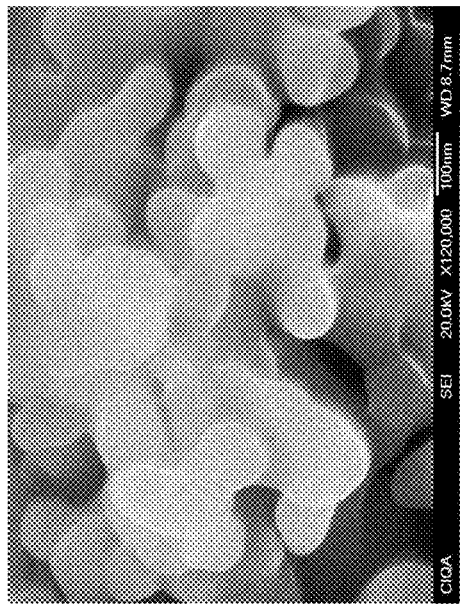
FIGS. 2a and b (FESEM pictures) illustrate a fine spherical and pure distribution of nano-$C_2S$ ($2CaO.SiO_2$)
Figure 2B:
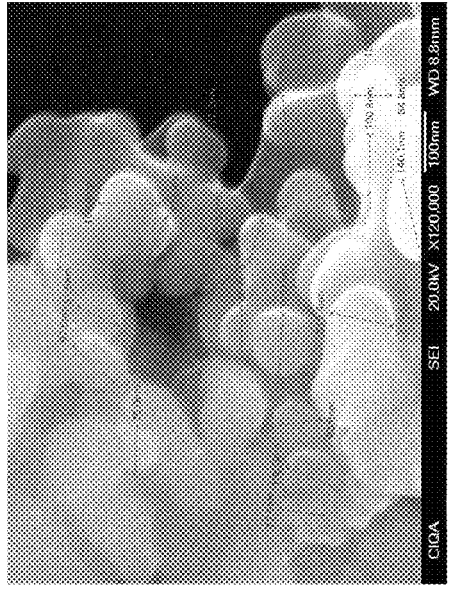
FIG. 2c is an HR-TEM picture of the smaller nanoparticles of this system.
FIGS. 2d, and 2e (FESEM pictures) illustrate a fine spherical and pure distribution of nano-$C_3S$ ($3CaO.SiO_2$)
FIG. 2f is an HR-TEM picture of the smaller nanoparticles of this system.
FIG. 2g (FESEM picture) illustrates fine spherical and pure distribution of nano-$SiO_2$.
FIG. 2h is an HR-TEM picture of the smaller nanoparticles of this system.
FIGS. 2i, j illustrate an FESEM analysis of the resulting hydration behavior of $C_2S$ and $C_3S$, respectively, according to the invention.
FIG. 2k (HR-TEM picture) illustrates the nanophase distribution into the nanostructured particles of $SiO_2$—$CaO$—$Al_2O_3$, according to the invention.
Figure 2C:
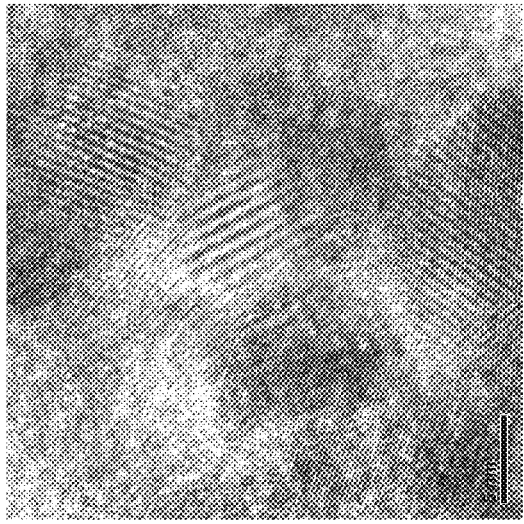
Figure 2E:
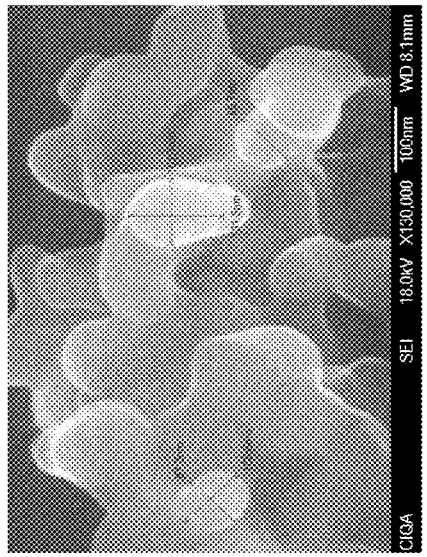
Figure 2D:
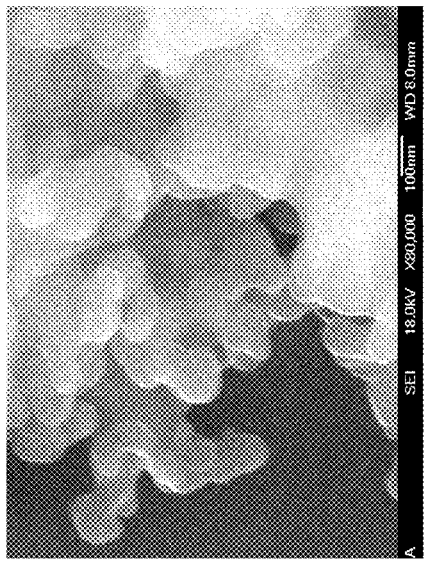
Figure 2F:
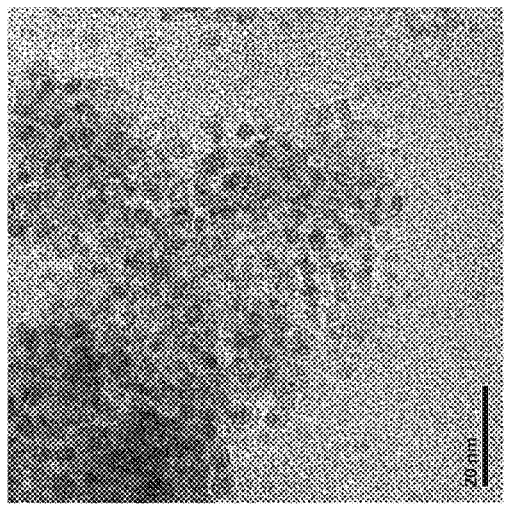
Figure 2H:
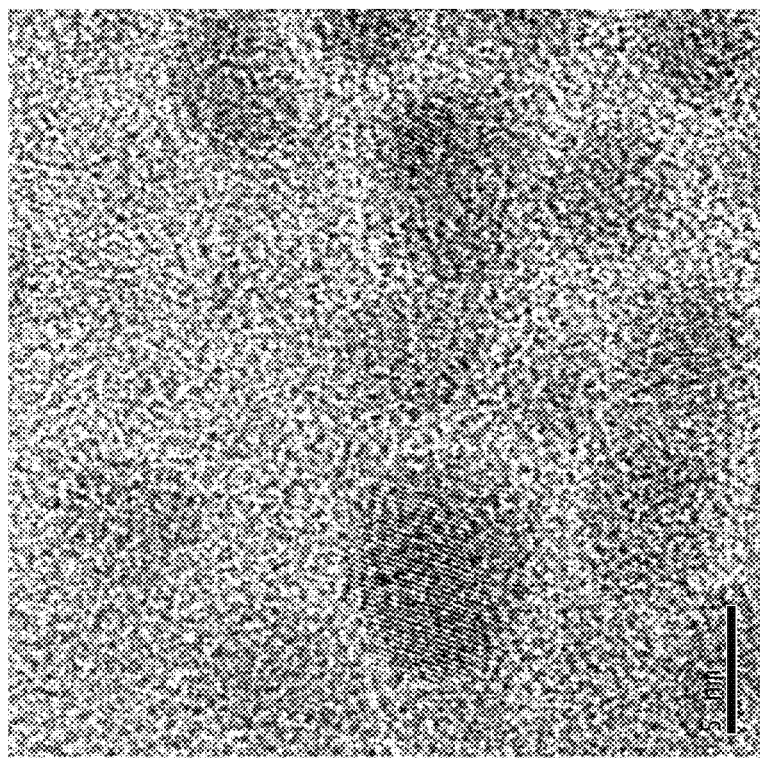
Figure 2G:
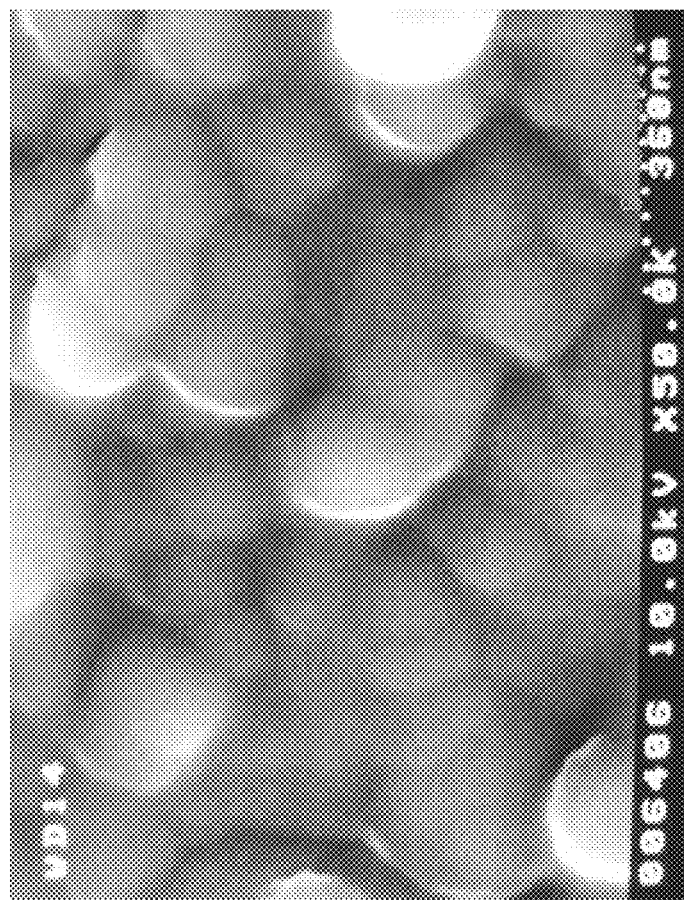

The product shows a fine spherical and pure distribution of nano-$C_2S$, as shown in FIGS. 2a, b and c, and nano-$C_3S$ as shown in FIGS. 2d, e and f. These particles have a particle size between 10-200 nm, and these can be compared with nano-$SiO_2$ synthesized by a similar procedure and illustrated in FIGS. 2g, h. These particles have a particle size of less than 100 nm.

Figures 2I, 2J:
Figure 2K:
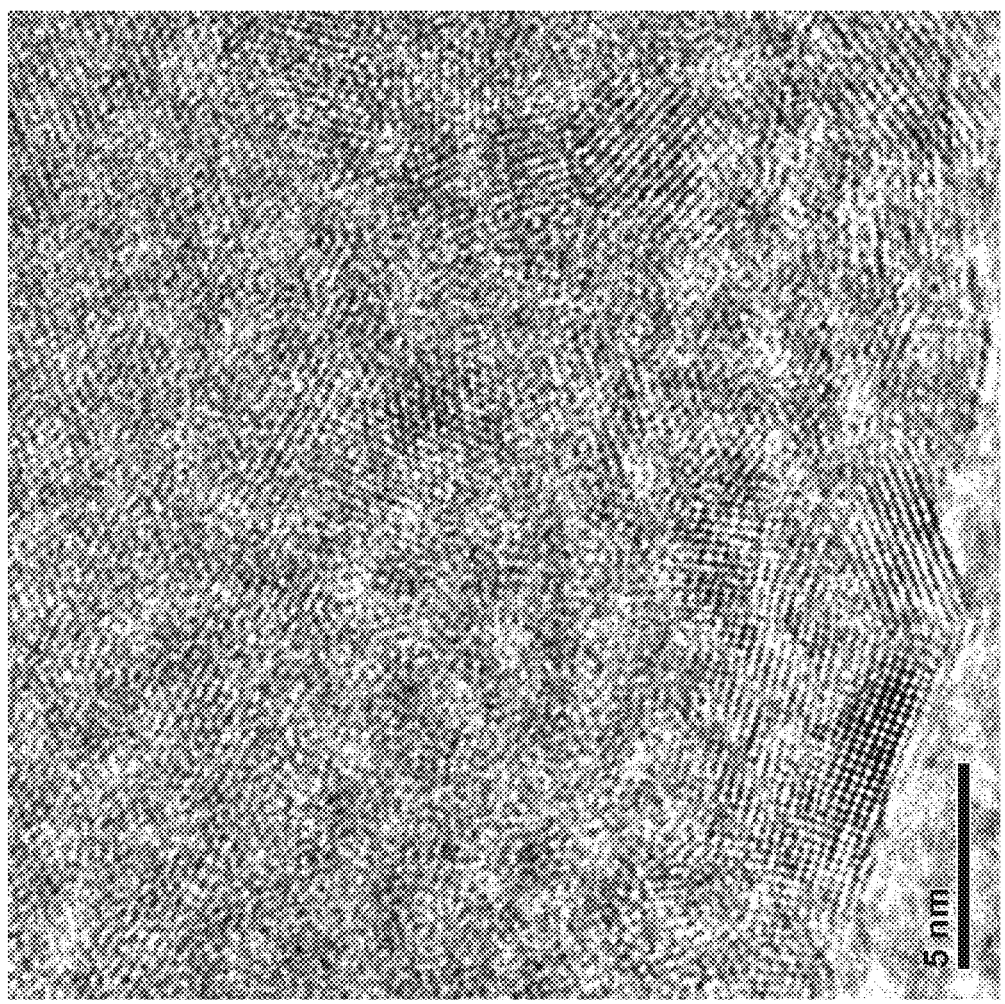

The particles synthesized as outlined above were exposed to x-ray radiation (XRD) using a copper K$\alpha$ ($\lambda$ equals 15,418 Å) with a graphite monochromatic filter to identify the microstructures. A Field Emissions Scanning Electron Microscopy (FESEM) was conducted using JEOL JSM-7401F equipment, also a characterisation for each nanosystem by High Resolution Transmission Electron Microscopy (HR-TEM) using a JEOL 2010 was carried out. The hydration behaviour of the di- and tricalcium silicate samples, with atmospheric water at room temperature, was observed by the FESEM procedure and the results are shown in FIGS. 2i and j. The preparation of these samples for the FESEM analysis included a quick extraction of the nano-particles from the beaker and coating with gold-palladium thin films using a conventional sputtering system with a posterior fast introduction into a vacuum chamber.

The above demonstrates that the nano-particles of the present invention can be produced following the processes discussed, and that the resulting structures are particularly useful in enhancing the properties of a cementitious structure.

This detailed description presents specific examples of materials according to the present invention, and is intended to be illustrative of the features of the present invention without being restrictive in nature. Thus, the scope of the present invention is considered to include all embodiments within the language set forth in the appended claims, and equivalents thereto.

What is claimed is:

1. A cement additive, comprising particles of SiO2-CaO—Al2O3 and at least one additive selected from the group consisting of nano-sized particles of SiO2, 2CaO.SiO2, 3CaO.SiO2, Al2O3, P—Ca and combinations thereof.

2. The cement additive of claim 1, wherein the additive comprises nano-sized particles of each of said SiO2, 2CaO.SiO2, 3CaO.SiO2, Al2O3 and P—Ca.

3. The cement additive of claim 1, wherein the nano-sized particles have a shape selected from the group consisting of spherical, ellipsoid, plate-shaped, irregular shape and combinations thereof.

4. The cement additive of claim 1, wherein the particles of SiO2-CaO—Al2O3 are nanostructured material particles.

5. The cement additive of claim 1, wherein the particles and the additive are present as a homogenous mixture.

6. A method for making the cement additive of claim 1, comprising the steps of:

separately synthesizing each of the particles of SiO2-CaO—Al2O3 and the nano-sized particles;

mixing the particles of SiO2-CaO—Al2O3 and nano-sized particles under a temperature and pH effective to form a surfactant containing the particles and nano-sized particles; and combining the particles of SiO2-CaO—Al2O3 and nano-sized particles in a solvent to provide a substantially homogeneous mixture of the particles and the nano-sized particles.

7. The method of claim 6, wherein the synthesizing step comprises synthesizing precursors to the particles of SiO2-CaO—Al2O3 and nano-sized particles; and thermally treating the precursors to obtain the particles and nano-sized particles.

8. The cement additive of claim 2, wherein the particles and the additive are present as a homogenous mixture.

9. The cement additive of claim 1, wherein the particles of SiO2-CaO—Al2O3 are composite particles comprising nano-sized particles of each of SiO2, Cao and Al2O3.

* * * * *